Aug. 28, 1945. W. E. MARTIN 2,383,666
TRAILER TONGUE CONSTRUCTION
Filed Dec. 7, 1943   3 Sheets-Sheet 1

INVENTOR.
WM. E. MARTIN
BY
Merrill M. Blackburn
Atty.

Aug. 28, 1945.       W. E. MARTIN        2,383,666
          TRAILER TONGUE CONSTRUCTION
            Filed Dec. 7, 1943       3 Sheets-Sheet 3
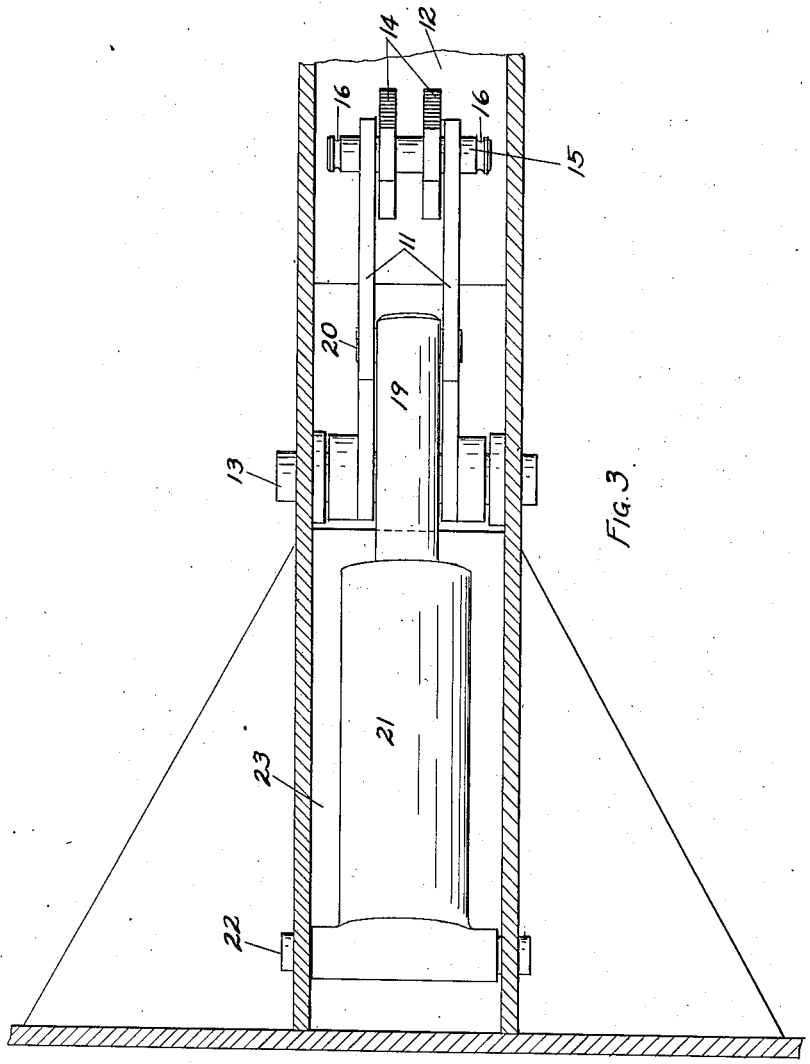
INVENTOR.
WM. E. MARTIN
BY
Merrill M. Blackburn
Atty.

Patented Aug. 28, 1945

2,383,666

UNITED STATES PATENT OFFICE 2,383,666

TRAILER TONGUE CONSTRUCTION

William E. Martin, Kewanee, Ill.

Application December 7, 1943, Serial No. 513,290

7 Claims. (Cl. 280—33.44)

The present invention relates to trailers and semi-trailers and more particularly to the connection of the trailer unit to the tractor unit and supporting means for the unsupported end of the trailer unit when that is disconnected from the tractor unit. It is at present a common practice to hitch the trailer to the tractor unit so that the axis of turn beween the two, when the tractor turns to go around a corner, will be coincident or substantially coincident with the turning axis of the tractor unit, resulting in the trailer unit clipping the corners about which the driver turns. By hitching the trailer to a projection extending rearwardly from the axle of the tractor unit to which the trailer unit is directly or indirectly connected, the connection of the trailer to the tractor is thrown to the right or to the left of the turning axis of the axle, when going around a corner, so that clipping of corners is minimized.

It is also common practice, when detaching a trailer unit from a tractor unit, to block up the unsupported end of the former so that it will not be necessary to lift this when it is desired to again hitch the trailer unit to the tractor unit. It is not always convenient to find the necessary material to do this unless one carries his blocking material with him. I overcome this objection by providing a power-actuated leg which can be forced down into contact with the ground, this leg being mounted in or on the trailer tongue, pivotally, or pivotally connected to the body of the trailer.

It is, therefore, among the objects of my invention to provide means for reducing clipping of corners by a trailer unit when being towed around corners by a tractor unit. A further object of this invention is to provide a readily operable support unit, in connection with a trailer unit, for supporting the unsupported part of such unit, when the same is detached from a tractor unit.

In the drawings annexed hereto and forming a part hereof,

Fig. 3 shows a plan view of a part of the trailer tongue shown in Figs. 1 and 2, with the top of the tongue removed to show the relationship of the parts therein.

Figure 1:
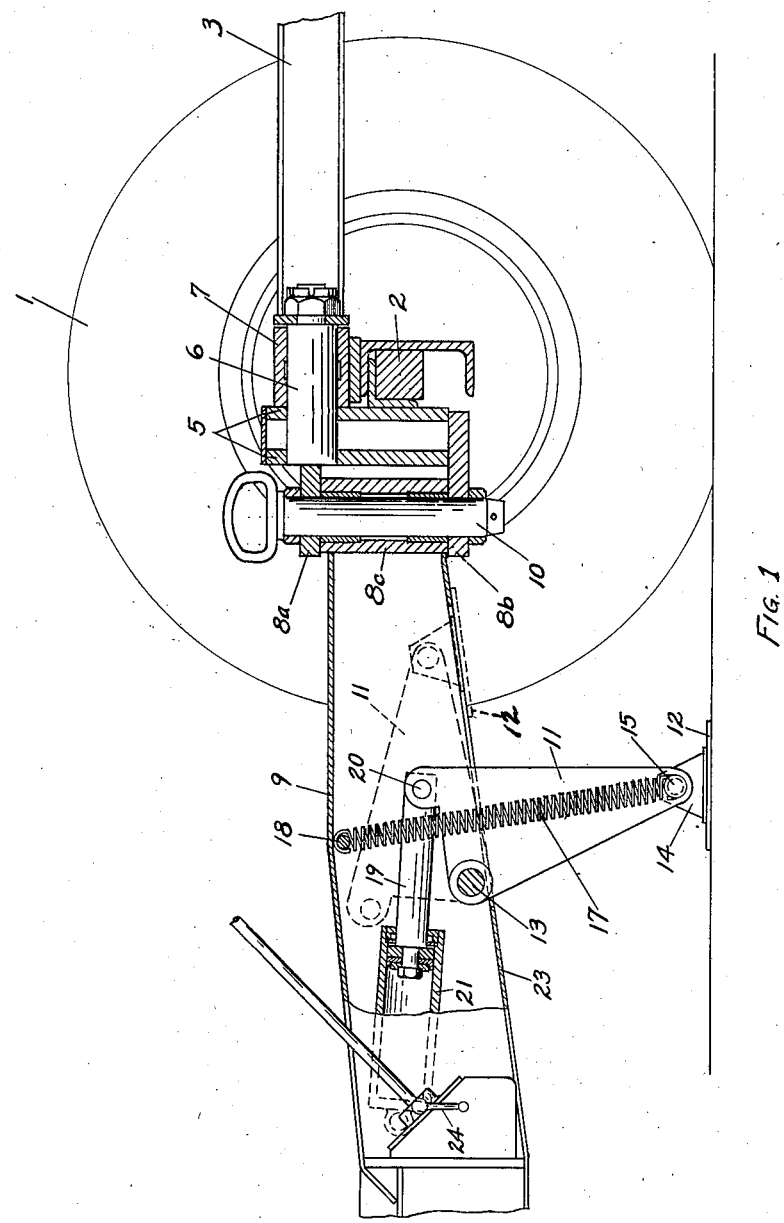
Fig. 1 shows, in fragmentary sectional elevation, the rear end of a tractor unit and the front part of a trailer unit, including the tongue by which the two units are connected.

Reference will now be made in greater detail to the annexed drawings for a more complete description of this invention. The wheels and axle of the tractor unit are indicated in the annexed drawings by the numerals 1 and 2, respectively, and the forwardly extending part of the tractor by the numeral 3. This serves as a reach connecting the front and rear elements of the tractor unit. The trailer hitch part of the tractor unit comprises the body 5 provided with the forwardly extending pintle 6 which is rotationally oscillatable in the bearing member 7, connected indirectly to the axle 2. This permits relative lateral rocking between the tractor and trailer units of the construction in going over uneven surfaces. Extending rearwardly from the body member 5 are upper and lower plates 8a and 8b which are spaced apart sufficiently to receive the head 8c of the trailer tongue 9. Through these plates and the head 8c extends the hitch or king pin 10 whereby the tractor and trailer units are connected, operatively.

Figure 2:
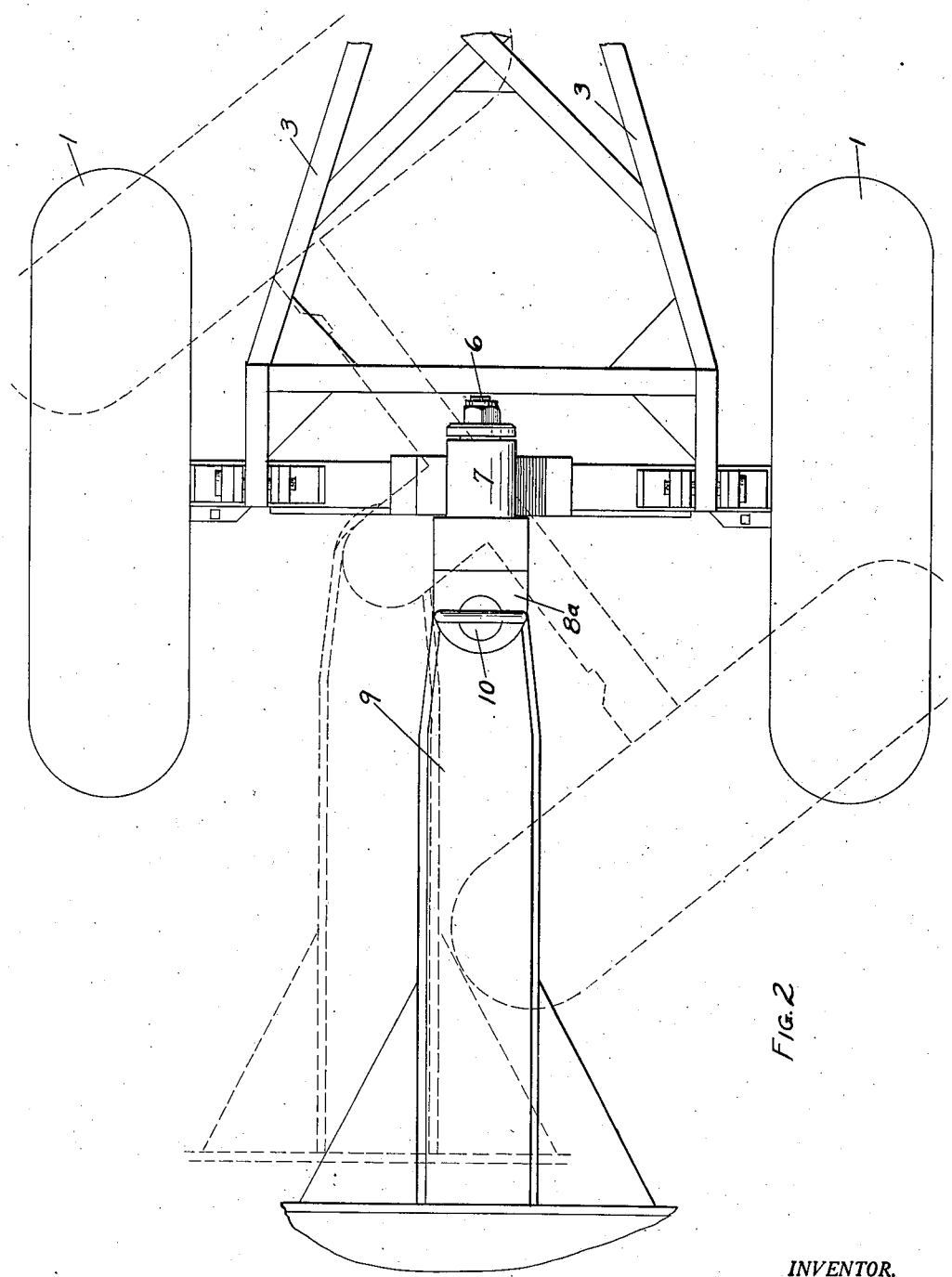
Fig. 2 shows a plan view of the structure shown in Fig. 1, looking downwardly upon that figure.

From an inspection of Fig. 2 it is apparent that, when the tractor unit is turned in going around a corner, the point of pivotal connection thereof to the tongue of the trailer unit is offset to one side of the direct line of pull and therefore the trailer is led around the corner in a wider arc than if it were connected directly in line with the vertical axis through the center of the rear axle of the tractor unit. This results in reducing the clipping of corners by the trailer unit.

While I have shown the trailer supporting leg in its preferred location, in the trailer tongue, I desire it understood that this may also be located under the body portion of the trailer, either centrally under one end or under one or more corners of the trailer. This leg serves as a trailer supporting prop and comprises the leg proper, 11, and the foot 12. A pivot pin 13 is shown as extending transversely through the tongue 9 near the lower edge thereof and pivotally connects the leg to the tongue. The upper position of this leg is shown by broken lines in Fig. 1 wherein the foot 12 is shown as closing the major part of the opening in the bottom of the tongue through which the leg rises and falls during its pivotal motion. I desire, also, to point out that this structure may be used as well with vehicles in which the tongue is pivotally connected to the trailer body as with those in which the connection is rigid, being mounted either in the tongue or under the body.

In Fig. 3, the leg is shown as comprising a pair of parallel plates which receive between them the lugs 14 extending upwardly from the flat plate of the foot. A pin 15 extends through the plates of the leg and the lugs of the foot to pivotally connect these parts so that the foot may be approximately horizontal at all times, both when covering the opening in the underside of the tongue and when resting on the ground. As shown in Fig. 3, the pin 15 is provided near its ends with grooves 16 for the reception of a loop at one end of each of a pair of springs 17. As shown in Fig. 1, a pin 18 extends transversely through the tongue 9 and is passed through a loop at the second end of each of the springs 17. These springs are under tension at all times and tend to raise the leg into the dotted line position shown in Fig. 1.

As shown in Fig. 1, the plunger 19 of a hydraulic jack is connected to the third corner of the plates of the leg 11 by a pin 20 which passes through these plates and the end of the plunger or piston rod 19. The rear end of the cylinder 21 of the jack is connected to the tongue 9, or the trailer body, by suitable means 22, shown in Fig. 3 as a transversely extending pin. Plate 23 closes the rear part of the bottom opening of the tongue 9, rearwardly from the foot 12. Suitable means, shown in part at 24, are provided for delivering hydraulic pressure fluid to the rear end of the cylinder 21 when it is desired to force the leg downwardly into the position shown in Fig. 1. Normally, this hydraulic pressure means would comprise a pressure tank, means for developing pressure therein, piping to carry the pressure fluid from the tank to the cylinder 21, and a valve for controlling admission of the pressure fluid to the cylinder and exit of the same therefrom.

It will be apparent that, when the leg is in the inoperative position shown by the broken lines in Fig. 1, the piston of the jack is in its fully retracted position, being forced there by the action of the springs 17 which lift the leg and foot into the upper position and cause the piston to slide in the cylinder. It is also apparent that, when hydraulic pressure is admitted to the rear end of the cylinder, the piston will be forced forwardly and will turn the leg downwardly about its pivot 13, causing extension of the springs 17, thus storing up power for the retraction of the leg when the escape valve from the cylinder is open. Hence, the leg is always held up in inoperative position when the weight of the trailer is not supported thereby and the hydraulic pressure is not holding the piston extended. The design of the parts is or may be such that the hydraulic means may exert a lifting pressure upon the tongue 9 or the end of the trailer whereby to make it possible easily to connect and disconnect the tractor and trailer units, when such is desired. It is also possible to lower the end of the trailer to the ground so that ramps for the loading of a machine on the trailer are not necessary. The leg and jack may then be used to raise the front end of the trailer so that it may be hitched to the tractor unit. The bottom edges of the plates of the leg 11 may be extended downwardly somewhat to make them even with the bottom of the tongue 9 and then have a cover plate secured thereto so as to cover substantially all of the opening in the tongue through which the leg swings, thus reducing to a minimum the amount of dirt which may enter the tongue.

It will of course be understood that various changes in the details shown may be restorted to without departing from the spirit of this invention as described and claimed herein.

Having now described my invention, I claim:

1. A supporting and lifting leg for a trailer tongue comprising a pair of leg members having matching pivot openings for the reception of spaced pivot members, pivot members secured in said pairs of openings, a foot suspended on one of said pivot members, another one of said pivot members pivotally connecting said leg to the tongue, power means connected to the third pivot member and serving to force the leg to turn downwardly into contact with the ground, and other power means connected to the leg to cause it to turn in the opposite direction.

2. A power-actuated lifting means for a hollow trailer tongue comprising a generally triangular leg having, adjacent one corner, pivotal connection with the tongue, having a ground-engaging foot connected adjacent a second corner, and having power means connected to the third corner, and retractile means connected to the leg remote from the connection of the leg to the tongue, said retractile means also being connected to the tongue to cause raising of the leg into inoperative position, the leg, when retracted, being substantially entirely housed within the tongue.

3. A structure for the purpose described comprising a generally triangular flat leg having a foot connected to one corner, having a second corner connected to a hollow trailer tongue at a point within and remote from the top thereof, and having a pushing jack connected to its third corner, said jack being connected to the tongue in a position to exert a push on said leg longitudinally of the tongue, and a spring for exerting on said leg a turning torque about the connection of the leg to the tongue whereby to cause lifting of the foot into proximity with the tongue, the jack alternatively pushing the leg downwardly against the torque of the spring.

4. In a structure for the purpose indicated, a generally triangular shaped flat leg having a foot connected to one corner and having its ground contacting face substantially perpendicular to the plane of the leg, a jack connected to a second corner, and a pivot member passing through its third corner whereby it is connected to a hollow trailer tongue, said jack being connected to the tongue and adapted to exert pressure between the tongue and the leg, and a spring for exerting force on the leg to turn it in a direction opposite to that caused by the jack.

5. In a trailer having a hollow tongue provided with an opening in its bottom part for the reception of a supporting leg, a jack therein and connected thereto to exert force in a direction generally longitudinally of the tongue, a leg having three pivot members arranged in the form of a triangle, one of the pivot members being connected to the jack, one to the tongue, and the third to a foot, said foot being flat and adapted to be forced into contact with the ground with a flat face resting thereon when the jack is actuated and to be raised into contact with the tongue when operating force is released from the jack, and means for moving said leg in a direction contrary to that caused by the jack and to cause the foot to act as a closure for the major part of the opening in the bottom of the tongue.

6. A structure for accomplishing the operation described comprising, in combination, a trailer tongue, hollow and open on the under side, for the reception and housing of a supporting leg and operating means therefor, a hydraulic jack mounted in the tongue and having one end secured thereto, a leg pivotally connected to the tongue adjacent the second end of the jack and connected thereto in a position to be operated by the jack, and means connected to the jack for supplying hydraulic pressure thereto whereby to turn the leg about its connection to the tongue and from concealment in the tongue into tongue supporting position.

7. In a structure for the purpose indicated, a hollow tongue, a jack mounted in the hollow of the tongue and secured operatively to the tongue, a leg pivotally connected to the tongue to swing within the hollow thereof and to swing downwardly through the bottom of the tongue, a foot pivotally connected to the lower end of the leg and adapted, when the leg is drawn up into the tongue, to cover a major portion of the opening in the under side of the tongue through which the leg swings, and means operatively connected to the leg and the tongue to cause retraction of the leg, automatically, upon the jack ceasing to exert a sufficient force to cause extension of the leg.

WILLIAM E. MARTIN.